O. HAUSSLER.
GUN SIGHT.
APPLICATION FILED SEPT. 17, 1917.
1,283,171.
Patented Oct. 29, 1918.
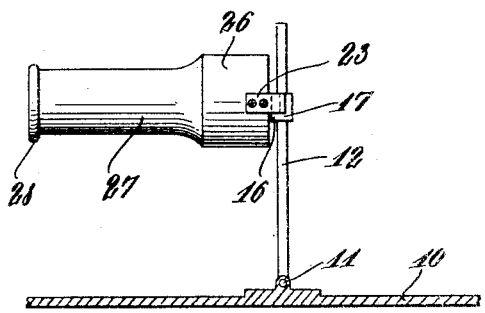
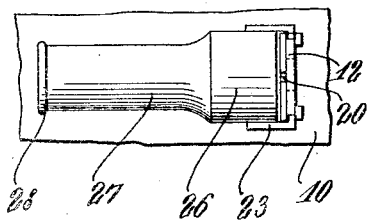
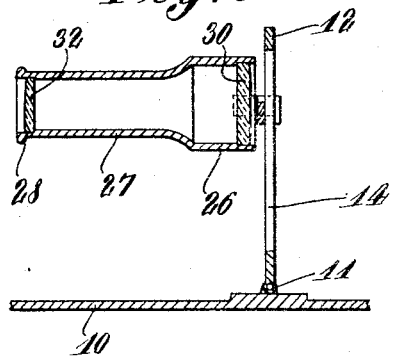
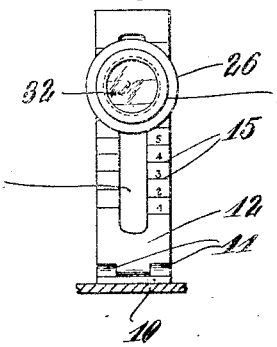
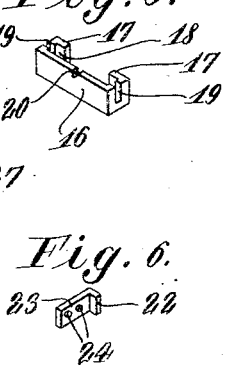
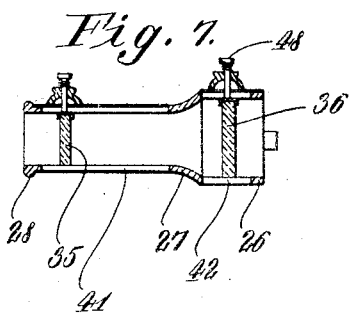
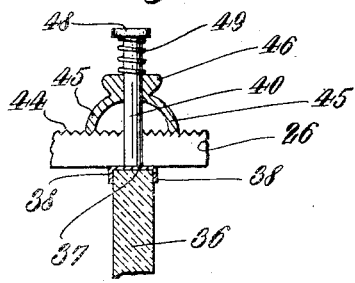
INVENTOR.
Otto Haussler.
BY
HIS ATTORNEY

UNITED STATES PATENT OFFICE.

OTTO HAUSSLER, OF GARFIELD, NEW JERSEY.

GUN-SIGHT.

1,283,171.  Specification of Letters Patent.  Patented Oct. 29, 1918.

Application filed September 17, 1917. Serial No. 191,743.

*To all whom it may concern:*

Be it known that I, OTTO HAUSSLER, a citizen of the United States, resident of Garfield, county of Bergen, and State of New Jersey, have invented certain new and useful Improvements in Gun-Sights, of which the following is a specification.

This invention relates to improvements in gun sights and has as its principal object the provision of a telescopic sight attachable to a gun of any description, the same being provided with means for being adjustably engaged and having movable lenses.

Another object is to provide means whereby the lenses may be moved in the telescope in an easy and convenient manner, and which may be automatically clamped in an adjusted position.

These and other like objects are attained by the novel construction and combination of parts hereafter described and shown in the accompanying drawings, forming a material part of this disclosure, and in which—

Figure 1 is a side elevational view of a gun sight made in accordance with the invention.

Fig. 2 is a top plan view of the same.

Fig. 3 is a longitudinal central sectional view.

Fig. 4 is a front end view of the same.

Fig. 5 is a detail perspective view of the slide in which the telescope is mounted.

Fig. 6 is a similar detail perspective view showing the part engaging the slide.

Fig. 7 is a longitudinal sectional view, similar to that of Fig. 3, but showing the lens mounting, and, Fig. 8 is an enlarged fragmental sectional view of the same.

Attached to the gun 10 or other ordnance to be sighted, is a raised hinge 11, engaging a plate 12, having a longitudinal slot 14, and bearing on its face a plurality of graduations 15, indicating the distance or range of the object aimed at.

Engaged with the plate 12 is a slide 16, having inturned ends 17, formed with slots 18 closely fitting the edges of the plate 12, and having open slots 19, at the ends, the plate also containing a V shaped groove 20, acting as a rear sight of the gun.

Engaged in the slots 19 are the extending lugs 22, of a pair of oppositely disposed plates 23, formed with screw holes 24, by means of which they are engaged with the enlarged end 26, of a telescopic tube 27, formed with a beading 28, at its front end, and containing a pair of lenses, respectively 30 and 32, the former being rigidly inserted in the larger end of the tube.

Thus it will be seen that the tube 27, may be raised and lowered relative to the support 10, or entirely removed from the same, and the plate 12 turned upon its hinge 11 so as to be completely out of the way when not in use.

In Figs. 7 and 8, the same supporting means previously described are used, and a like tube 27, has slidably engaged in it the lens 35, the larger end 26 of the tube having another lens 36, both of the lenses being adjustable longitudinally within the tube by means of a cap 37, having depending side flanges 38, contactable with the marginal sides of the lens and provided with a rigid post 40, extending through the slots 41 and 42, formed longitudinally in the tube, the outer surface of which has corrugations 44, engageable with the feet 45, of an adjustable bracket 46 through which the stem 40 passes.

Formed on the outer end of the stem 40, in a knob or head 48 between which, and the outer surface of the bracket 46, is disposed a spiral compression spring 49, the same having sufficient force as to cause the bracket to be firmly seated upon the corrugated surface, thereby holding the lenses in any adjusted position.

From the foregoing, it will be seen that by manipulating the knob 48, the lens may be brought into any desired position relative one to the other, and that the same may be done in a convenient and rapid manner so as to bring the object aimed at into view.

Having thus described my invention what I claim as new and desire to secure by Letters Patent, is—

A telescope of the character described, comprising a longitudinally slotted tube provided with outer corrugations, and having an enlargement at one end, a lens slidably engaged in said tube, a second lens in said enlargement, flanged caps for longitudinally adjusting both lenses within said tube, rigid posts carried by said caps and extending through the longitudinal slots in said tube, brackets through which said posts are passed having feet engaging the corrugations on said tube, a knob on the outer ends of said posts, and spiral compression springs between said brackets and said knobs adapted to firmly press the feet of said brackets against the corrugations on said tube for holding the lenses in any adjusted position, substantially as described.

In testimony whereof I have affixed my signature.

OTTO HAUSSLER.